United States Patent
Katz et al.

(10) Patent No.: US 6,711,094 B1
(45) Date of Patent: Mar. 23, 2004

(54) METHOD AND APPARATUS FOR ACTIVE SONAR DETECTION ENHANCEMENT

(75) Inventors: Richard A Katz, East Lyme, CT (US); Albert H. Nuttall, Old Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/409,711

(22) Filed: Apr. 8, 2003

(51) Int. Cl.[7] .............................................. G01S 15/00
(52) U.S. Cl. ......................................................... 367/97
(58) Field of Search ............................ 367/13, 135, 97, 367/98

(56) References Cited

U.S. PATENT DOCUMENTS

| | | | | |
|---|---|---|---|---|
| 6,275,523 B1 | * | 8/2001 | Chen et al. | 375/226 |
| 6,285,972 B1 | * | 9/2001 | Barber | 701/97 |
| 6,327,315 B1 | * | 12/2001 | Piirainen | 370/347 |

OTHER PUBLICATIONS

Krot et al.; Voltera–Wiener Functionals for Tasks Process Recognition Tasks solving; Jan. 15, 2002; 3 pages.*

* cited by examiner

Primary Examiner—Daniel T. Pihulic
(74) Attorney, Agent, or Firm—James M. Kasischke; Michael F. Oglo; Jean-Paul A. Nasser

(57) ABSTRACT

The present invention provides a method and apparatus for enhancing active sonar signal detection by estimating the channel/target response utilizing measured values of the excitation signals and received signals. A Wiener/Volterra series expansion for the excitation and received signals is used as a model, wherein a time invariant environment is assumed, thereby disregarding all random noise contributions. The Wiener/Volterra kernels are then determined in a nonlinear processor using a method of correlations which is designed to produce the kernels utilizing only measured white Gaussian excitation signals and received signals. The kernels can be used to give an optimum correlation between the excitation signals and the received signals.

17 Claims, 2 Drawing Sheets

METHOD AND APPARATUS FOR ACTIVE SONAR DETECTION ENHANCEMENT

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to systems and methods for active sonar systems and, more particularly, to a sonar system and method for improved active sonar detection by accurate estimation of the channel/target nonlinear response function.

(2) Description of the Prior Art

Active sonar signal propagation and reflection has intrinsic properties that are noticeably affected by the channel and/or target characteristics. Often, one knows, through measurements, the signal transmitted into the propagation channel and the waveform at the receiver output. The difficulty is to accurately measure and estimate what happens between the excitation input and output.

Signal distortion in an active sonar system may arise for many reasons such as, for example, shallow basins with nonlinear boundary conditions, irregular sea bottoms and surface interactions, bubble formations and nonlinear scattering within the propagation channel, reverberation, non-homogeneities in sound speed propagation, inelastic target response, target scattering profiles, multipath reflections, additive noise generated by waves, transmission losses, changing distances from the target, and the like.

Active sonar as used herein refers to sonar systems that utilize radiating acoustic sources to probe an area to be searched so as to acoustically illuminate the submerged object. One example of this type of sonar system is a conventional sonar device, wherein a highly directional beam of sonic energy periodically radiates from a scanning transducer, which in turn operates as a receiver to detect echoes reflected from any object(s) within the propagation channel. Modern active sonar systems commonly provide multibeam capabilities as well. Active sonar signals can have relatively high transmission losses which increase as a function of the frequency of the propagated energy.

A large number of active sonar data processing techniques rely on linearity in an acoustic signature (e.g., temporal fluctuations, power spectra) for extracting and identifying information about a particular target illuminated by the active transmission. However, if linear techniques are applied to a target-of-interest in which the target and/or channel response is actually nonlinear, then subsequent purely linear processing of these data leads to results that are incorrect and can be misleading.

Various inventors have attempted to solve the above and related problems as evidenced by the following patents.

U.S. Pat. No. 6,285,972 B1, issued Sep. 4, 2001, to A. J. Barber, discloses a method for generating an improved nonlinear system model that includes generating a linear system model and using a response therefrom to generate the nonlinear system model. A method and system for generating drive signals for a test system uses the improved nonlinear system model or a conventional nonlinear system model.

U.S. Pat. No. 6,327,315 B1, issued Dec. 4, 2001, to O. Purainen, discloses a method for estimating an impulse response and a receiver in a radio system where the signal to be sent comprises a known training sequence, which receiver comprises means for sampling the received signal, and means for calculating a first estimate for the impulse response by means of the known training sequence. To enable an accurate determination of the impulse response, the receiver comprises means for making preliminary decisions on the received samples by means of the first impulse response estimate, means for calculating an error value of the estimated samples and the received samples calculated by means of the preliminary decisions, means for calculating a second estimate of the impulse response by minimizing said error value, and means for calculating a new estimate for the impulse response, by combining the first and second estimates with each other.

U.S. Pat. No. 6,275,523 B1, issued Aug. 14, 2001, to Chen et al., discloses a system for in-service nonlinearity measurements that measures such nonlinearities by way of comparing received linear error-corrected unfiltered signal samples with re-generated reference signal samples to calculate magnitude and phase nonlinear error values. Linear distortion is removed from the received signal samples in order to truly characterize nonlinear behavior of the transmitter. The linear error-corrected received signal samples are generated without applying the receiver shaping filtering. Reference signal samples are re-generated from estimated transmitted symbols from the unfiltered linear error-corrected received signal samples. The transmitted symbols are estimated using a multi-region slicer which dynamically estimates constellation decision levels from the unfiltered signal samples. A weighted, least-square based polynomial regression is performed on magnitude and phase nonlinear error values in order to estimate magnitude and phase nonlinear error functions while suppressing the impact of other non-systematic distortions.

The above cited prior art does not provide a means for accurately measuring and estimating what occurs between the excitation input produced by the acoustic transmitter and output or received response. Consequently, there remains a long felt but unsolved need for an improved means for improved techniques to determine the channel/target response function, including nonlinear effects therein. Those skilled in the art will appreciate the present invention that addresses the above and other problems.

SUMMARY OF THE INVENTION

Accordingly, it is an object of the present invention to provide an improved active sonar detection apparatus and method.

Another object of the present invention is to provide a method and apparatus to determine a channel/target nonlinear response function and/or the significance of the effect of nonlinearities in the channel/target response function.

These and other objects, features, and advantages of the present invention will become apparent from the drawings, the descriptions given herein, and the appended claims. However, it will be understood that the above listed objects and advantages of the invention are intended only as an aid in understanding aspects of the invention, and are not intended to limit the invention in any way, and do not form a comprehensive list of objects, features, and advantages.

In accordance with the present invention, a method for enhancing active sonar is provided by determining optimum detector. This includes providing a controlled excitation signal for in-water transmission of an acoustic signal and receiving a response signal produced in response to said in-water transmission of said acoustic signal. The method then calculates a Wiener/Volterra kernel from the excitation signal and response signal. Any Wiener/Volterra kernels related to random noise contributions are omitted. The optimum detector is determined by using the remaining Wiener/Volterra kernels to give an optimal correlation between the excitation signal and the response signal. Additional details are provided for determining different orders of Wiener/Volterra kernels.

The method may further comprise comparing a power of the response signal to the residual power to determine the contribution of nonlinearity to the total response signal. In a preferred embodiment, the Volterra/Wiener expansion is limited to third order using the above described remaining Wiener/Volterra kernels which are represented by the following equation:

$$y(t) = h_0 + \int d\tau_1 h_1(\tau_1) \times (t-\tau_1) +$$
$$\int\int d\tau_1 d\tau_2 h_2(\tau_1,\tau_2) \times (t-\tau_1) \times (t-\tau_2) +$$
$$\int\int\int d\tau_1 d\tau_2 d\tau_3 h_3(\tau_1,\tau_2,\tau_3) \times (t-\tau_1) \times (t-\tau_2) \times (t-\tau_3)$$

The invention may also comprise a system or apparatus for active sonar detection which may comprise one or more features such as, for instance, an in-water transmitter operable to produce an excitation signal for transmission of an acoustic signal, a receiver to receive a response signal, a model for operating on the excitation signal and the response signal, and a nonlinear processor operable for computing $h_0$, $h_1$, $h_2$, and $h_3$ from the above described equation.

The nonlinear processor is preferably operable for measuring the response signal when the excitation signal is zero, for purposes of determining $h_0$. The nonlinear processor is preferably operable for measuring the response signal while controlling the excitation signal to be real white Gaussian noise at different power factor levels to thereby compute $h_1$. Furthermore, the nonlinear processor is operable for utilizing a correlation between the excitation signal and the response signal for determining $h_2$. The nonlinear processor can also utilize a second correlation between the excitation signal and the response signal for determining $h_3$. The nonlinear processor can utilize $h_0$, $h_1$, $h_2$, and $h_3$, for determining a residual power. The nonlinear processor can also compare a power of the response signal to the residual power to determine the total contribution of nonlinear components to the response signal.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein.

BRIEF DESCRIPTION OF THE PREFERRED EMBODIMENTS

The proposed system and method of signal detection enhancement incorporates a Wiener/Volterra model for characterizing the channel/target response function from an acoustic time series measurement of the output response of a receiving hydrophone element or array, given a known white Gaussian pseudo-random noise excitation input.

Figure 1:
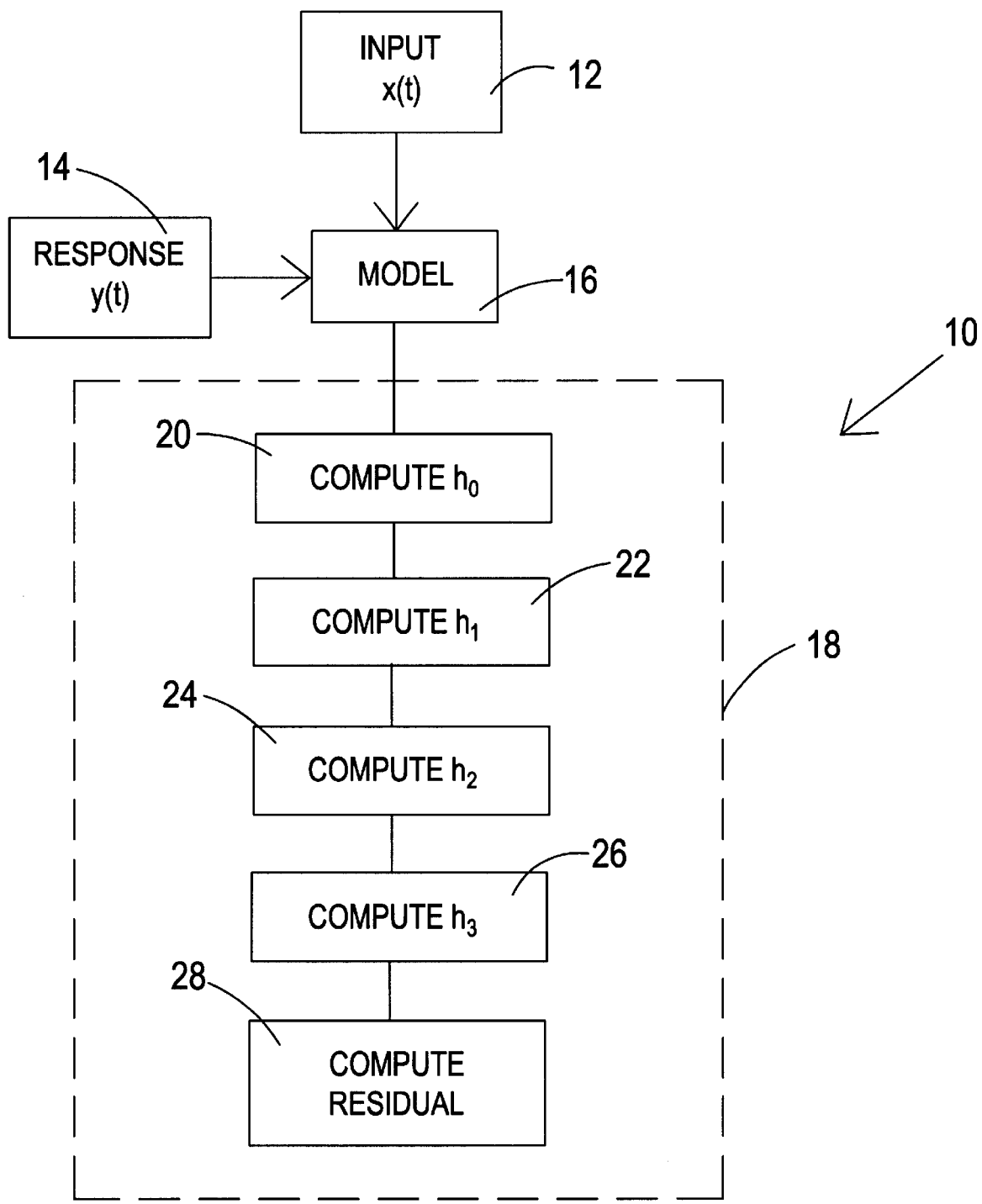
FIG. 1 is a block diagram view which shows a sonar detection enhancement system in accord with the present invention.

Referring now to the drawings, and more specifically to FIG. 1, there is provided a block diagram for the sonar detection enhancement method and apparatus 10 in accord with the present invention.

In a presently preferred embodiment, a Wiener/Volterra series expansion is provided for a given excitation x(t) which is indicated as input x(t) 12 in FIG. 1, and response y(t) as indicated as response y(t) 14 in FIG. 1. The details of a presently preferred embodiment of the invention are discussed in detail below. However, as an aid to understanding, a brief summary of operation is given at this time. Input 12 and response 14 are applied to model 16, which is shown in more detail in FIG. 2. The output of model 16 is applied to nonlinear processor 18. Nonlinear processor 18 is utilized to determine kernels $h_0$, $h_1$, $h_2$, and $h_3$ as indicated at 20, 22, 24, and 26. Computed residual 28 may be determined from the above information. The computed residual may be utilized to determine the importance of nonlinear components that arise due to the environment of operation as well. If desired, an estimate can also be provided for the signal and noise interference for a particular environment.

Accordingly, a very general model is initially used for determining channel/target response from acoustic time series measurements. Starting with the most general case, time variation of the channel is incorporated and a variety of additive and multiplicative noise types are considered. For practical considerations, both of these conditions are relaxed hereinafter as discussed subsequently.

$$y(t) = h_0(t) + \sum_K \int \ldots^{(K)} \int d\tau_1 \ldots d\tau_K h_K(t; \tau_1, \ldots, \tau_K) x(t-\tau_1) \ldots x(t-\tau_K) \tag{1}$$

From equation (1), one deduces a variety of noise types:

$$h_0(t) = h_{0D} + h_{0R}(t) \tag{2}$$

where: $h_{0D}$ is a constant additive deterministic component, and $h_{0R}(t)$ is a stationary random process of zero mean (without loss of generality).

Note that $h_{0R}(t)$ takes the place of additive noise, n(t). Next consider:

$$h_1(t; \tau_1) = h_{1D}(\tau_1) + h_{1R}(t; \tau_1) \tag{3}$$

where: $h_{1D}(\tau_1)$ is a nonrandom first-order deterministic filter, and $h_{1R}(t; \tau_1)$ is a stationary random process of zero mean (without loss of generality).

The output corresponding to $h_{1R}(t; \tau_1)$ is given by the following expression:

$$y_{1R}(t) = \int d\tau_1 h_{1r}(t;\tau_1) x(t-\tau_1) \tag{4}$$

where the integrand of equation (4) represents multiplicative noise of first-order.

Similarly, we can have multiplicative noise of second-order by breaking $h_2(t; \tau_1, \tau_2)$ into a deterministic and a random component. For the higher-order kernels, one obtains:

$$h_K(t; \tau_1, \ldots, \tau_K) = h_{KD}(\tau_1, \ldots, \tau_K) + h_{KR}(t; \tau_1, \ldots, \tau_K) \quad (5)$$

where: $h_{KD}(\tau_1, \ldots, \tau_K)$ is a K-th order deterministic filter, and $h_{KR}(t; \tau_1, \ldots, \tau_K)$ is a random filter of zero mean (without loss of generality).

Note that the latter term on the right-hand side of equation (5) yields multiplicative noise of order K.

For problems of practical interest in sonar applications, a time-invariant environment is assumed. Therefore, to simplify the analysis, all random noise contributions, $h_{KR}(t; \tau_1, \ldots, \tau_K)$ are disregarded. These omissions are accepted as the natural contributions to measurement and estimation errors induced by the model. This leads to the following expression:

$$y(t) = h_0 + \sum_K \int \ldots^{(K)} \int d\tau_1 \ldots d\tau_K h_K(\tau_1, \ldots, \tau_K) x(t-\tau_1) \ldots x(t-\tau_K) \quad (1)$$

The kernels, $\{h_K(\tau_1, \ldots, \tau_K)\}$, are represented in this sonar context by the channel response, target response, or interaction of the two together. The aim is to evaluate contributions up to and including third order which would yield complete information on $h_1$, $h_2$, and $h_3$. If the actual sonar system is greater than third order, the kernel estimates will be biased. It is presently believed that third-order estimates will be sufficient for most practical applications. For this case, it is also assumed that the random processes x(t) and y(t) are stationary. Another point of note is that the kernels in the above expression can be taken to be symmetric, without loss of generality. That is to say, the order of the arguments is immaterial.

The main goal, in this presently preferred embodiment, is to obtain a solution for the kernels $\{h_K(\tau_1, \ldots, \tau_K)\}$, $K \leq 3$, while considering a time-invariant system of order 3. For example, if we restrict the general equation (6) to a third-order system, we obtain explicitly (for no additive noise) a presently preferred model as indicated at 16 in FIG. 1, shown in more detail in FIG. 2, and described by the following equation:

$$y(t) = h_0 + \int d\tau_1 h_1(\tau_1) \times (t-\tau_1) + \int\int d\tau_1 d\tau_2 h_2(\tau_1,\tau_2) \times (t-\tau_1) \times (t-\tau_2) + \int\int\int d\tau_1 d\tau_2 d\tau_3 h_3(\tau_1,\tau_2,\tau_3) \times (t-\tau_1) \times (t-\tau_2) \times (t-\tau_3) \quad (7)$$

where the subscript "D" has been suppressed for convenience.

Figure 2:
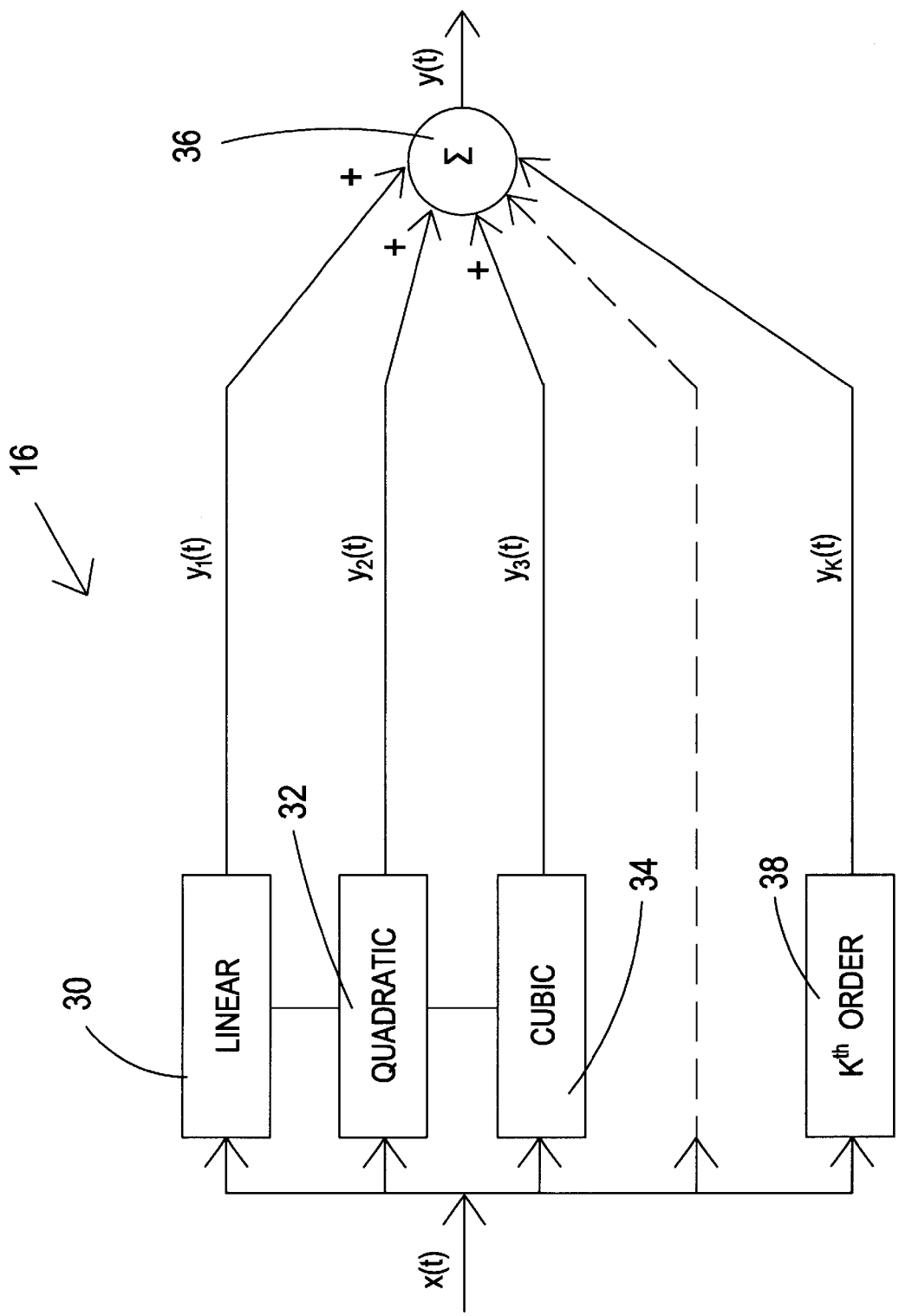
FIG. 2 is a schematic diagram view which shows a model for nonlinear sonar signal propagation in accord with the present invention.

This equation provides the basis of model 16, as shown in FIG. 2, which is limited, in this presently preferred embodiment, to a third-order system of the general equation (6). Thus, linear elements 30, quadratic elements 32, cubic elements 34, and $K^{th}$ order elements 38 may be added within summation unit 36 to produce a model output that is applied to nonlinear processor 18.

With the presently preferred model 16 in mind, the following cases are now considered.

Case I:

If x(t)=0 for all t then:

$$y(t) = h_0. \quad (8)$$

This allows for explicit determination of $h_0$ as indicated at 20 in FIG. 1 within nonlinear processor 18.

Case II:

Let excitation x(t) be real white Gaussian noise of spectral level, $\rho$ watts/Hz, and y(t) is the observed response.

Consider cross-correlation, $C(\tau_a) = \overline{y(t) \times (t-\tau_a)}$. The overbar is an ensemble average over many realizations. In actual use, an acceptable practice is to take the sample mean in place of the ensemble mean.

$$\overline{y(t) \times (t-\tau_a)}$$
$$= \rho h_1(\tau_a) +$$
$$\rho^2 \int\int\int d\tau_1 d\tau_2 d\tau_3 (\tau_1,\tau_2,\tau_3)[\delta(\tau_1-\tau_2)\delta(\tau_a-\tau_3) + \delta(\tau_1-\tau_3)\delta(\tau_a-\tau_2) + \delta(\tau_a-\tau_1)\delta(\tau_2-\tau_3)] = \rho h_1(\tau_a) +$$
$$3\rho^2 \int d\tau_1 h_3(\tau_1,\tau_2,\tau_a). \quad (9)$$

If the system is only second-order, the last term on the right-hand side of equation (9) is zero and the equation is reduced accordingly.

Case III:

The higher order correlation where $\tau_a \neq \tau_b$ is obtained as follows:

$$\overline{y(t) \times (t-\tau_a) \times (t-\tau_b)} =$$
$$h_0 \rho \delta(\tau_a-\tau_b) + \rho^2 \int\int d\tau_1 d\tau_2 h_2(\tau_1,\tau_2)[\delta(\tau_1-\tau_2)\delta(\tau_a-\tau_b) + \delta(\tau_1-\tau_a)\delta(\tau_2-\tau_b) + \delta(\tau_1-\tau_b)\delta(\tau_2-\tau_a)]$$
$$= h_0 \rho \delta(\tau_a-\tau_b) + \rho^2[\delta(\tau_a-\tau_b)\int d\tau_1 h_2(\tau_1,\tau_1) + 2h_2(\tau_a,\tau_b)]$$
$$= [h_0 + \rho \int d\tau_1 h_2(\tau_1,\tau_1)]\rho\delta(\tau_a-\tau_b) + 2\rho^2 h_2(\tau_a,\tau_b) =$$
$$\overline{y(t)} \rho \delta(\tau_a-\tau_b) + 2\rho^2 h_2(\tau_a,\tau_b). \quad (10)$$

This allows for determination of $h_2(\tau_a,\tau_b)$ at any $\tau_a, \tau_b$ pair of interest. Thus, $h_2$ can be determined as indicated at 24 in nonlinear processor 18 of FIG. 1

Case IV:

Consider the higher order correlation, $\overline{y(t) \times (t-\tau_a) \times (t-\tau_b) \times (t-\tau_c)}$, where $\tau_a \neq \tau_b \neq \tau_c$:

$$\overline{y(t) \times (t-\tau_a) \times (t-\tau_b) \times (t-\tau_c)} = \rho^2 [h_1(\tau_a) \delta$$

$$(\tau_b - \tau_c) + h_1(\tau_b) \delta$$

$$(\tau_a - \tau_c) + h_1(\tau_c) \delta$$

$$(\tau_a - \tau_b)] + 3\rho^3 \int d\tau$$

$$_1 h_3(\tau_1, \tau_1, \tau_a) \delta$$

$$(\tau_b - \tau_c) + 3\rho^3 \int d\tau_1 h_3(\tau_1, \tau_1, \tau_b) \delta$$

$$(\tau_a - \tau_c) + 3\rho^3 \int$$

$$d\tau_1 h_3(\tau_1, \tau_1, \tau_c) \delta$$

$$(\tau_a - \tau_b) + 6\rho^3 h_3(\tau_a, \tau_b, \tau_c) = \rho [C(\tau_a) \delta$$

$$(\tau_b - \tau_c) + C(\tau_b) \delta$$

$$(\tau_a - \tau_c) + C(\tau_c) \delta$$

$$(\tau_a - \tau_b)] + 6\rho^3 h_3(\tau_a, \tau_b, \tau_c). \quad (11)$$

This allows for determination of $h_3(\tau_a, \tau_b, \tau_c)$ at any arguments of interest, so that $h_3$ can be determined as indicated at 26 in nonlinear processor 18 of FIG. 1.

To summarize the model, mean value, $\overline{y(t)}$, provides information on $\int d\tau_1 h_2(\tau_1, \tau_1)$, while $\overline{y(t) \times (t-\tau_a)}$ provides information on $\int d\tau_1 h_3(\tau_1, \tau_1, \tau_a)$. Note that because these expressions are integrals, only partial information on the kernels themselves is yielded. Moreover, higher-order correlations are used to determine $h_2(\tau_a, \tau_b)$ and $h_3(\tau_a, \tau_b, \tau_c)$ for any arguments $\tau_a \neq \tau_b \neq \tau_c$.

By measuring $\overline{y(t) \times (t-\tau_a)}$, one can extract information about $h_1(\tau_a)$, and as already stated, $h_0$ is determined by setting $x(t)=0$. The sum of all the nonlinear components, which will be referred to as the nonlinear residual (as indicated at 28 in FIG. 1), $r(t)$, is defined according to the following equation:

$$r(t) = y(t) - h_0 - \int$$

$$d\tau_1 h_1(\tau_1) \times (t-\tau_1). \quad (12)$$

If it turns out that the power in the residual, $r(t)$, is significantly lower than the power in the measured total system output $y(t)$, then one could conclude that the total contribution of the nonlinear components in $y(t)$ is inconsequential. On the other hand, if the totality of nonlinear components in $y(t)$ are substantial, then the system nonlinearity is of paramount importance. It is most likely that the relative degree of nonlinearity for a particular sonar problem of interest will be highly situationally dependent. That is to say, it will depend on environmental conditions, source and receiver measurement geometry, oceanography, target characteristics, the acoustic waveform(s) under consideration as well as their absolute levels, and combinations of all these variables.

Given a solution for kernels, $\{h_k(\tau \ldots)\}$, the detection enhancement feature of the method of the present invention falls out immediately, because the channel/target response can be used as an optimum predictor to estimate the signal and noise interference for determining the likelihood ratio (LR) processor for a particular environment. In other words, the kernels can be used to remove the effects the transmission channel has on the input and give the sonar operator a clearer view of the target.

Thus, the proposed method has an advantage over conventional methods in that the kernels, $\{h_k(\tau \ldots)\}$, are determined empirically from the Wiener/Volterra model using measured values of the excitation input and receiver output. By knowing the channel/target response (i.e., the kernels, $\{h_k(\tau \ldots)\}$), one can determine the probability density distributions with which to calculate the optimum LR processor for a prescribed signal environment.

The active sonar detection enhancement method and apparatus is applicable to any situation which utilizes the transmission, propagation, and reception of active underwater acoustic signals. It is particularly useful in environments in which nonlinearity may be the dominant factor, such as shallow basins with nonlinear boundary conditions.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for enhancing active sonar by determining an optimum detector comprising:
   providing a controlled excitation signal for in-water transmission of an acoustic signal;
   receiving a response signal produced in response to said in-water transmission of said acoustic signal;
   calculating Wiener/Volterra kernels from said controlled excitation signal and said response signal;
   omitting any of said calculated Wiener/Volterra kernels related to random noise contributions; and
   determining the optimum detector by using the remaining Wiener/Volterra kernels to give an optimal correlation between said controlled excitation signal and said response signal.

2. The method of claim 1, wherein:
   said controlled excitation signal is set to zero;
   said received response signal is the received response when said controlled excitation signal is zero; and
   said step of calculating comprises calculating a zero-th order Wiener/Volterra kernel from said received response signal.

3. The method of claim 2, wherein:
   said controlled excitation signal is real white Gaussian noise;
   said received response signal is the received response signal at a first time delay when said controlled excitation signal is real white Gaussian noise; and
   said step of calculating comprises calculating a first order Wiener/Volterra kernel from said controlled excitation signal and said received response signal.

4. The method of claim 3, wherein:
   said received response signal is the received response signal at a second time delay when said controlled excitation signal is real white Gaussian noise; and
   said step of calculating comprises calculating a second order Wiener/Volterra kernel from said controlled excitation signal, said received response signal at the first time delay, and said received response at the second time delay.

5. The method of claim 4, wherein:
   said received response signal is the received response signal at a third time delay when said controlled excitation signal is real white Gaussian noise; and
   said step of calculating comprises calculating a third order Wiener/Volterra kernel from said controlled excitation signal, said received response signal at the first time delay, said received response at the second time delay, and said received response at the third time delay.

6. The method of claim 5, further comprising receiving responses at additional time delays and calculating higher order Wiener/Volterra kernels from said controlled excitation signal and said received response signals at all time delays.

7. The method of claim 3, further comprising calculating a residual power utilizing said response signal and said zero-th order and first order Wiener/Volterra kernels.

8. The method of claim 7, further comprising:
calculating a power of said response signal; and
comparing said response signal power to said residual power to determine the total contribution of nonlinear components to said response signal.

9. The method of claim 1, wherein said Wiener/Volterra kernels are limited to the third order and are calculated utilizing the following equation:

$$y(t) = h_0 + \int d\tau_1 h_1(\tau_1) \times (t-\tau_1) + \iint d\tau_1 d\tau_2 h_2(\tau_1, \tau_2) \times (t-\tau_1) \times (t-\tau_2) + \iiint d\tau_1 d\tau_2 d\tau_3 h_3(\tau_1, \tau_2, \tau_3) \times (t-\tau_1) \times (t-\tau_2) \times (t-\tau_3).$$

10. An apparatus for active sonar detection, said apparatus comprising:
an in-water transmitter operable to produce an excitation signal for in-water transmission of an acoustic signal;
a receiver to receive a response signal produced in response to said in-water transmission of said acoustic signal;
a model receiving an excitation signal and a response signal from the sonar system comprising an adder for receiving a linear equation, a quadratic equation, and a cubic equation; and
a nonlinear processor operable for computing kernels that may be represented as $h_0$, $h_1$, $h_2$, and $h_3$.

11. The apparatus of claim 10, wherein said model is represented by the following equation:

$$y(t) = h_0 + \int d\tau_1 h_1(\tau_1) \times (t-\tau_1) + \iint d\tau_1 d\tau_2 h_2(\tau_1, \tau_2) \times (t-\tau_1) \times (t-\tau_2) + \iiint d\tau_1 d\tau_2 d\tau_3 h_3(\tau_1, \tau_2, \tau_3) \times (t-\tau_1) \times (t-\tau_2) \times (t-\tau_3).$$

12. The apparatus of claim 11, wherein said nonlinear processor is operable for measuring said response signal when said excitation signal is zero for determining $h_0$.

13. The apparatus of claim 12, wherein said nonlinear processor is operable for measuring said response signal while controlling said excitation signal to be real white Gaussian noise.

14. The apparatus of claim 13, wherein said nonlinear processor is operable for utilizing a correlation between said excitation signal and said response signal for determining $h_2$.

15. The apparatus of claim 14, wherein said nonlinear processor is operable for utilizing a second correlation between said excitation signal and said response signal for determining $h_3$.

16. The apparatus of claim 15, wherein said nonlinear processor is operable for utilizing $h_0$, $h_1$, $h_2$, and $h_3$ for determining a residual power.

17. The apparatus of claim 16, wherein said nonlinear processor is operable for comparing a power of said response signal to said residual power to determine the total contribution of nonlinear components to said response signal.

* * * * *